United States Patent
Huang et al.

(10) Patent No.: US 9,410,789 B2
(45) Date of Patent: Aug. 9, 2016

(54) SYSTEM AND METHOD FOR USING ELECTROMAGNET ARRAYS TO DETERMINE 3D RELATIVE POSITION OF ELECTRONIC DEVICE CORRESPONDING TO OBJECT

(71) Applicant: INSTITUTE FOR INFORMATION INDUSTRY, Taipei (TW)

(72) Inventors: Yi-Shu Huang, New Taipei (TW); Chih-Hao Hsu, Taipei (TW); Neng-Hao Yu, Yuli Township (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 579 days.

(21) Appl. No.: 13/921,426

(22) Filed: Jun. 19, 2013

(65) Prior Publication Data
US 2014/0163924 A1    Jun. 12, 2014

(30) Foreign Application Priority Data

Dec. 11, 2012  (TW) .............................. 101146526 A

(51) Int. Cl.
*G01B 7/00*  (2006.01)
*G01B 7/14*  (2006.01)
*G01B 7/004* (2006.01)

(52) U.S. Cl.
CPC  *G01B 7/14* (2013.01); *G01B 7/003* (2013.01); *G01B 7/004* (2013.01)

(58) Field of Classification Search
USPC .................................................. 702/150, 152
See application file for complete search history.

(56) References Cited

U.S. PATENT DOCUMENTS

| | | | |
|---|---|---|---|
| 5,574,836 A * | 11/1996 | Broemmelsiek | 345/427 |
| 7,525,309 B2 * | 4/2009 | Sherman et al. | 324/247 |
| 2002/0077752 A1 * | 6/2002 | Burreson et al. | 701/300 |
| 2006/0061354 A1 * | 3/2006 | Wallance et al. | 324/207.15 |
| 2010/0201351 A1 * | 8/2010 | Clymer | 324/207.2 |

\* cited by examiner

*Primary Examiner* — Huan Tran
(74) *Attorney, Agent, or Firm* — Birch, Stewart, Kolasch & Birch, LLP

(57) ABSTRACT

A method for using electromagnet arrays to determine a 3D relative position of an electronic device corresponding to an object is provided. The method includes: providing an object using an electromagnet array composed of a plurality of electromagnets, wherein each electromagnet corresponds to one of a plurality of XY plane position information; sensing, by a magnetic sensor of an electronic device, a magnetic signal generated by the electromagnet array; determining, by a processing unit of the electronic device, the XY plane position information of the electronic device corresponding to the object according to the magnetic signal and the XY plane position information; sensing, by the magnetic sensor, a magnetic variation corresponding to the magnetic signal; and obtaining, by the processing unit, a Z-axis position information of the electronic device corresponding to the object according to the magnetic variation.

16 Claims, 4 Drawing Sheets

SYSTEM AND METHOD FOR USING ELECTROMAGNET ARRAYS TO DETERMINE 3D RELATIVE POSITION OF ELECTRONIC DEVICE CORRESPONDING TO OBJECT

CROSS REFERENCE TO RELATED APPLICATIONS

This application claims priority of Taiwan Patent Application No. 101146526, filed on Dec. 11, 2012, the entirety of which is incorporated by reference herein.

BACKGROUND OF THE INVENTION

1. Field of the Invention

The present invention relates to a method and system for using electromagnet arrays to determine a position in three-dimensional (3D) space of an electronic device corresponding to an object, and in particular to a method and system for using magnet signals and magnet variation ranges of electromagnet arrays to determine a 3D relative position of an electronic device corresponding to an object.

2. Description of the Related Art

With developments in the information industry and the demand for instant messaging applications, traditional signages and digital signages in a variety of presentations have been used in our daily lives. Compared with traditional signages such as posters, digital signages can present diverse images and render different content for consumers (viewers) according to time, place, and so on. Digital signages can further attract and target the person more accurately.

Due to the popularity and extensive use of mobile devices, they can currently be used to query information with large-scale digital signage by using Near Field Communication (NFC). In addition, a reader on a mobile device can be used to sense a tag (e.g., QR code, barcode) on digital signage to obtain advertising information on the digital signage. For traditional signage, the mobile device can also use a digital camera to photograph a QR code (to record URL information) that may be printed on the signage, and obtain the required information from a specific web site that the QR code points to.

However, use of the reader device is not popular and an additional sensing component has to be installed in the mobile device. Since the QR code needs to be displayed on the signage (such as digital signage, or traditional signage), it would occupy the display space that is designed to display information on the signage and is not very pleasing to the eye for the signage. In addition, the two methods described above cannot determine the relative position of the mobile device corresponding to the signage in 3D space.

Therefore, a method of determining the position of the mobile device relative to the signage and letting the user use the electronic device to interact with the contents of the signage is a problem that needs to be solved.

BRIEF SUMMARY OF THE INVENTION

A detailed description is given in the following embodiments with reference to the accompanying drawings.

Methods and systems for using electromagnet arrays to determine a 3D relative position of an electronic device corresponding to an object are provided.

In one exemplary embodiment, the disclosure is directed to a method for using electromagnet arrays to determine a 3D relative position of an electronic device corresponding to an object, comprising: providing an object equipped with an electromagnet array composed of a plurality of electromagnets, wherein each electromagnet corresponds to one of a plurality of XY plane position information; sensing, by a magnetic sensor of an electronic device, a magnetic signal generated by the electromagnet array, wherein the magnetic signal is obtained according to a relative position of the electronic device corresponding to the object; determining, by a processing unit of the electronic device, the XY plane position information of the relative position of the electronic device corresponding to the object according to the magnetic signal and the plurality of XY plane position information; sensing, by the magnetic sensor, a magnetic variation corresponding to the magnetic signal; and obtaining, by the processing unit, a Z-axis position information of the relative position of the electronic device corresponding to the object according to the magnetic variation.

In one exemplary embodiment, the disclosure is directed to a system for using electromagnet arrays to determine a 3D relative position of an electronic device corresponding to an object, comprising: an object, configured to be equipped with an electromagnet array composed of a plurality of electromagnets, wherein each electromagnet corresponds to one of a plurality of XY plane position information; and an electronic device, which comprises: a magnetic sensor, configured to sense a magnetic signal generated by the electromagnet array, wherein the magnetic signal is obtained according to a relative position of the electronic device corresponding to the object; and a processing unit, coupled to the magnetic sensor and configured to determine the XY plane position information of the relative position of the electronic device corresponding to the object according to the magnetic signal and the plurality of XY plane position information, and obtain a Z-axis position information of the relative position of the electronic device corresponding to the object according to a magnetic variation corresponding to the magnetic signal sensed by the magnetic sensor.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
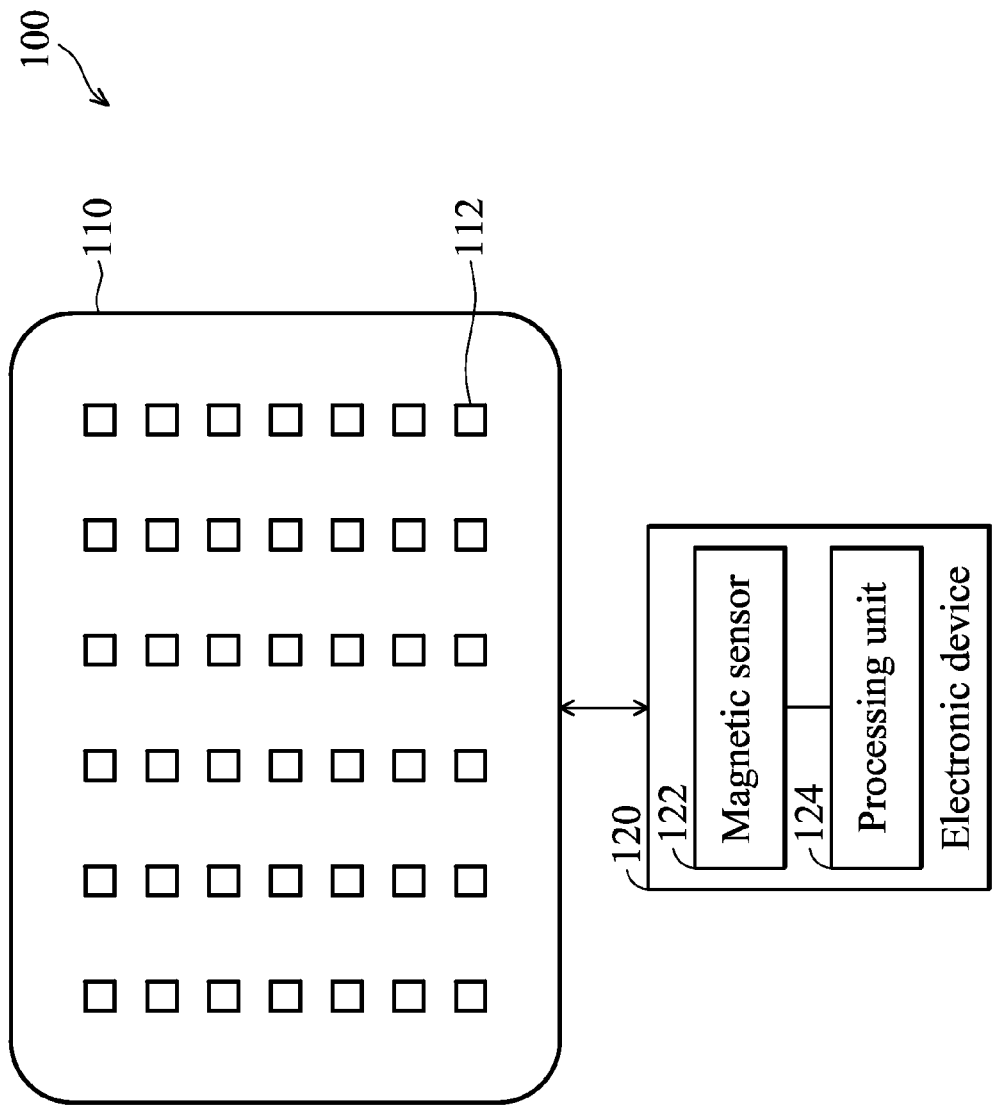
FIG. 1 is a block diagram of a system for using electromagnet arrays to determine a 3D relative position of an electronic device corresponding to an object according to a first embodiment of the present invention

Several exemplary embodiments of the application are described with reference to FIGS. 1 through 3, which generally relate to an electronic device and method for using electromagnet arrays to determine a 3D relative position of an electronic device corresponding to an object. It is to be understood that the following disclosure provides various different embodiments as examples for implementing different features of the application. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

FIG. 1 is a block diagram of a system 100 for using electromagnet arrays to determine a 3D relative position of an electronic device corresponding to an object according to a first embodiment of the present invention. The system 100 comprises an object 110 and an electronic device 120, wherein the electronic device 120 comprises a magnetic sensor 122 and a processing unit 124.

The object 110 is configured to be equipped with an electromagnet array composed of a plurality of electromagnets 112, wherein each electromagnet 112 corresponds to one of a plurality of XY plane position information. In the embodiment, the object 110 may be a display or a digital signage which can display multimedia information, such as a cathode ray tube (CRT) display, an LCD screen, a touch-sensitive display, a plasma screen, a light-emitting diode (LED) screen, a tablet, and a panel. The object 110 also may be a traditional (non-electronic) signage which is composed of various material for laying out information, or a non-signage object whose shape is better flat, but it is not limited thereto. The electromagnet 112 may be configured on the front or the back of the object 110, but is preferred to be configured on the back of the object 110.

The electronic device 120 may be an intelligent terminal device, smart phone, PAD or any other device equipped with magnetic sensors. The magnetic sensor 122 of the electronic device 120 is configured to sense a magnetic signal generated by the electromagnet array of the object 110, wherein the magnetic signal is obtained according to a relative position of the electronic device 120 corresponding to the object 110. The magnetic signal can be a change frequency caused by the North and South magnetic poles of any electromagnet in the electromagnet arrays. In other embodiments, each electromagnet in the electromagnet arrays can generate the corresponding magnetic signal. That is to say, each electromagnet has a different change frequency caused by the North and South magnetic poles, which may correspond to a magnet number of each electromagnet respectively. The signal sensed by the magnetic sensor 122 corresponds to the magnet number of the electromagnet which is closest to the electronic device 120 among the plurality of electromagnets 112. The electromagnet which is closest to the electronic device 120 is usually an electromagnet from which the magnetic sensor 122 receives the strongest magnetic signal, and therefore the magnetic sensor 122 can determine the strongest magnetic signal as the magnetic signal generated by the electromagnet arrays. The processing unit 124 further executes an application with display information, wherein each magnet number corresponds to one of the display information in advance. Therefore, when the processing unit 124 obtains the magnet number in the magnet signal, the processing unit 124 can obtain the display information corresponding to the magnet number according to the magnet number, and the display information is displayed by the electronic device 120. The display information mentioned in the embodiment can be text, images, purchase information, links, and other information.

The processing unit 124 of the electronic device 120 is coupled to the magnetic sensor 122, and configured to determine a XY plane position information of the electronic device 120 corresponding to the object 110 according to the magnetic signal and the plurality of XY plane position information. The processing unit 124 further obtains a Z-axis position information of the relative position of the electronic device 120 corresponding to the object 110 according to a magnetic variation corresponding to the magnetic signal sensed by the magnetic sensor 122. For example, the processing unit 124 can establish the corresponding XY plane coordinate value corresponding to each magnet in the electromagnet array in advance. After the processing unit 124 obtains the magnet signal, the processing unit 124 can determine which electromagnet corresponds to the magnet signal, and determine the XY plane position information of the relative position of the electromagnet corresponding to the magnet signal as the XY plane position information (such as the XY plane coordinate value) of the electronic device corresponding to the object. For the general characteristics of the electromagnet, when the magnetic sensor is closer to the electromagnet, the magnetic variation of the magnetic signal received by the magnetic sensor will be larger, wherein the magnetic variation is an angle swung by a digital compass. That is to say, when the magnetic sensor 122 is closer to a certain electromagnet along the Z-axis direction, the angle swung by the digital compass is larger because the effect of the magnetic field generated from the electromagnet is larger. When the magnetic sensor 122 is farther from the electromagnet along the Z-axis direction, the angle swung by the digital compass is smaller because the effect of the magnetic field generated from the electromagnet is smaller. Therefore, the processing unit 124 may determine the distance between the electronic device to the object according to the magnetic variation, and also determine the Z-axis position information of the relative position (such as the Z-axis coordinate value) of the electronic device corresponding to the object.

Figure 2A:
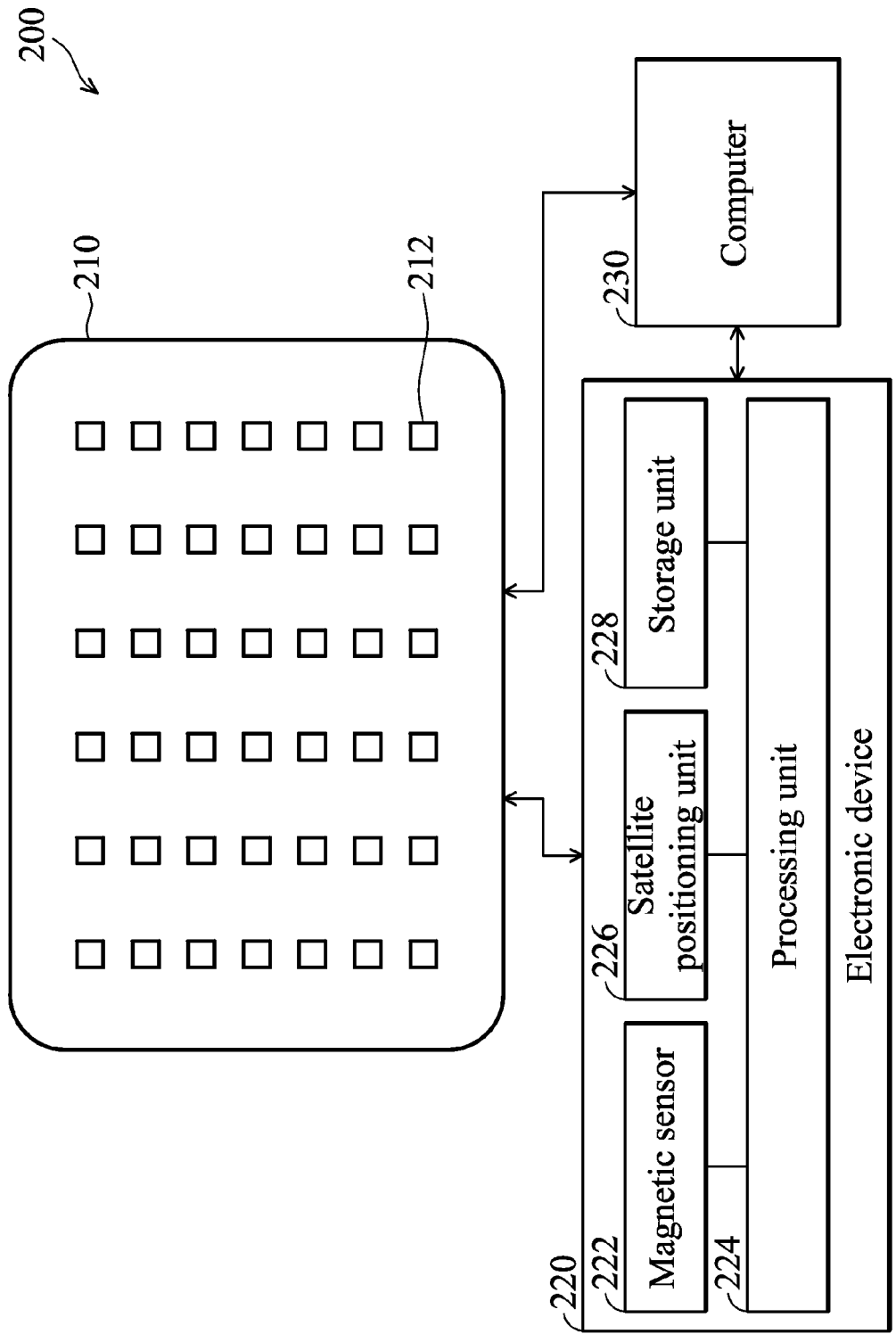
FIGS. 2A~2B are block diagrams of a system for using electromagnet arrays to determine a 3D relative position of an electronic device corresponding to an object according to a second embodiment of the present invention.
Figure 2B:
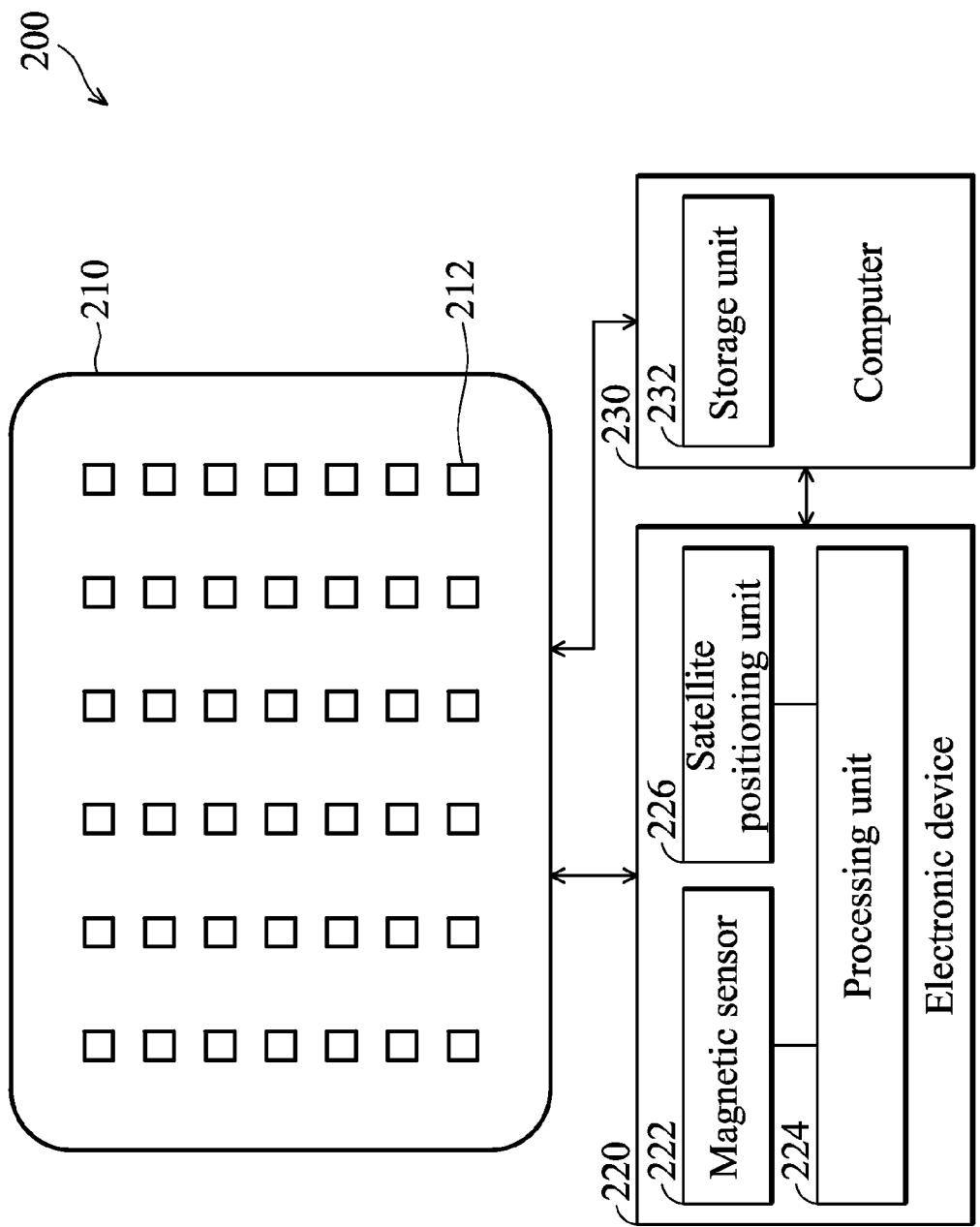

FIGS. 2A~2B are block diagrams of a system 200 for using electromagnet arrays to determine a 3D relative position of an electronic device corresponding to an object according to a second embodiment of the present invention. The system 200 comprises an object 210, an electronic device 220 and a computer 230. The electronic device 220 comprises a magnetic sensor 222, a processing unit 224, and a satellite positioning unit 226. Components having the same name as described in the first embodiment have the same function, so the details related to the functions of the components will be omitted.

The main difference between FIGS. 2A~2B and FIG. 1 is that the system 200 further comprises a computer 230, and the electronic device 220 further comprises the satellite positioning unit 226.

In the second embodiment, the computer 230 may be installed near the object 210, and is coupled to the electronic device 220 via a communication network. The computer is configured to receive the XY plane position information and the Z-axis position information transmitted by the processing unit 224 of the electronic device 220, and transmits corresponding information to the processing unit 224 according to the XY plane position information and the Z-axis position information.

It is worth noting that, in the embodiment, the system 200 further comprises a storage unit, which is configured to store the XY plane position information corresponding to each magnet number. The storage unit can be installed in the electronic device 220 (such as the storage unit 228 shown in FIG. 2A), and can also be installed in the computer 230 (such as the storage unit 232 shown in FIG. 2B). The storage unit 228 and 232 may be a device or an apparatus which can store information, such as, but not limited to, a hard disk drive, a memory, a Compact Disc (CD), a digital video disk (DVD), a computer, a server, or other device.

In the embodiment, the processing unit 224 can divide a range of the magnetic variation into a plurality of sections, wherein each section can correspond to one of a plurality of Z-axis position information. For example, the magnetic variation of the section is larger, the Z-axis position information corresponding to the section is smaller (meaning that the electronic device 220 is closer to the object 210). Conversely, the magnetic variation of the section is smaller, the Z-axis position information corresponding to the section is larger (meaning that the electronic device 220 is further from the object 210). The processing unit 224 can determine one of the plurality of sections as a corresponding section according to the magnetic variation, and determine the Z-axis position information of the relative position of the electronic device 220 corresponding to the object 210 according to the plurality of Z-axis position information corresponding to the corresponding section. The plurality of sections of the magnetic variation and the plurality of Z-axis position information corresponding to each section can also be stored in the storage unit 228 or 232. The storage unit 228 which is installed in the electronic device 220 and coupled to the processing unit 224 is adopted in the following embodiments as illustrated in FIG. 2A. In the embodiment, the magnetic signal is the magnet number of the electromagnet which is closest to the electronic device 220 among the plurality of electromagnets 212. The processing unit 224 obtains the magnet number according to the magnetic signal, and obtains the XY plane position information of the relative position of the electronic device 220 corresponding to the object 210 from the storage unit 228 according to the XY plane position information corresponding to each magnet number and the magnet number stored in the storage unit 228.

In another embodiment, a magnetic signal may be the magnet numbers of the plurality of electromagnets 212 which are close to the electronic device 220 within a specific range. The processing unit 224 can obtain the magnet numbers according to the magnet numbers, and obtain a plurality of XY plane position information (such as XY-axis coordinate values) corresponding to the magnet numbers from the storage unit 232 according to the XY plane position information corresponding to each magnet number and the magnet number. Then, the processing unit 224 calculates a center of the plurality of XY plane position information by using an average calculation, a weighting calculation, a center calculation, or other calculation, and generates a XY plane position information as the XY plane position information of the relative position of the electronic device 220 corresponding to the object 210. For example, when the magnetic sensor 222 of the electronic device 220 receives change frequencies caused by the North and South magnetic poles of some electromagnets 212 at a certain position at the same time, the relative position of the electronic device 220 corresponding to the object 210 can be among several electromagnets 212. Therefore, the processing unit 224 can obtain the magnetic numbers according to the change frequencies caused by the North and South magnetic poles of some electromagnets 212, calculate and generate the XY plane position information of the relative position of the electronic device 220 corresponding to the object 210 according to the XY plane position information corresponding to each electromagnet.

In addition, the system 200 may also comprise a plurality of objects 210, wherein each object 210 corresponds to an object number respectively, and is equipped with a electromagnet array composed of a plurality of electromagnets 212. For example, a plurality of objects can be a plurality of signages, and the plurality of signages can be regarded as a group. The position corresponding to each electromagnet on each object can provide different display information, respectively. Many signages can be installed in the same location, and can also be installed in different locations.

In the embodiment, the magnetic signal is an object number of an object which is the closest to the electronic device 220 among the plurality of objects 210 and the magnet number of the electromagnet which is closest to the electronic device 220 among the plurality of electromagnets 212. The processing unit 224 can execute an application with display information and each magnet number of each object number corresponds to one of the display information in advance. Then, the processing unit 224 obtains the display information corresponding to the magnet signal according to the object number, the magnet number, and the display information corresponding to each magnet number of each object number. Finally, the electronic device 220 displays the display information via the application. In another embodiment, the display information corresponding to each magnet number of each object number can also be established in the computer 230 in advance. When the processing unit 224 obtains the magnet number and the object number, the processing unit 224 can connect to a computer 230 via the communication network, and then the computer 230 provides the display information corresponding to the magnet number and the object number. After the processing unit 224 receives the display information, the electronic device 220 displays the display information corresponding to the magnet number.

In another embodiment, the system 200 may comprise a plurality of objects 210, wherein each object 210 among the plurality of objects 210 corresponds to an object number respectively, and is equipped with a electromagnet array composed of a plurality of electromagnets, and the magnetic signal is the magnet number of the electromagnet which is closest to the electronic device 220 among the plurality of electromagnets. In the embodiment, a satellite positioning unit is used to determine a relative position of the electronic device 220, and the processing unit 224 determines which object the electronic device 220 is closest to, and obtains the object number of the object which is closest to the electronic device 220. Then, the processing unit 224 obtains the magnet number of the electromagnet which is closest to the electronic device 220 according to the magnet signal, and obtains the display information corresponding to the object number and the magnet number. The satellite positioning unit 226 is coupled to the processing unit 224 and is configured to receive a satellite positioning information. The processing unit 224 executes an application with object geographic location information and display information, wherein each object number corresponds to one of the object geographic location information and one of the display information in advance. The processing unit 224 determines the object number of the object which is closest to the electronic device 220 according to the satellite positioning information and the object geographic location information corresponding to each object number. Then, the processing unit 224 obtains the display information corresponding to the magnet signal according to the object number, the magnet number, and the display information corresponding to each magnet number of each object number. Finally, the processing unit 224 displays the display information via the application.

Figure 3:
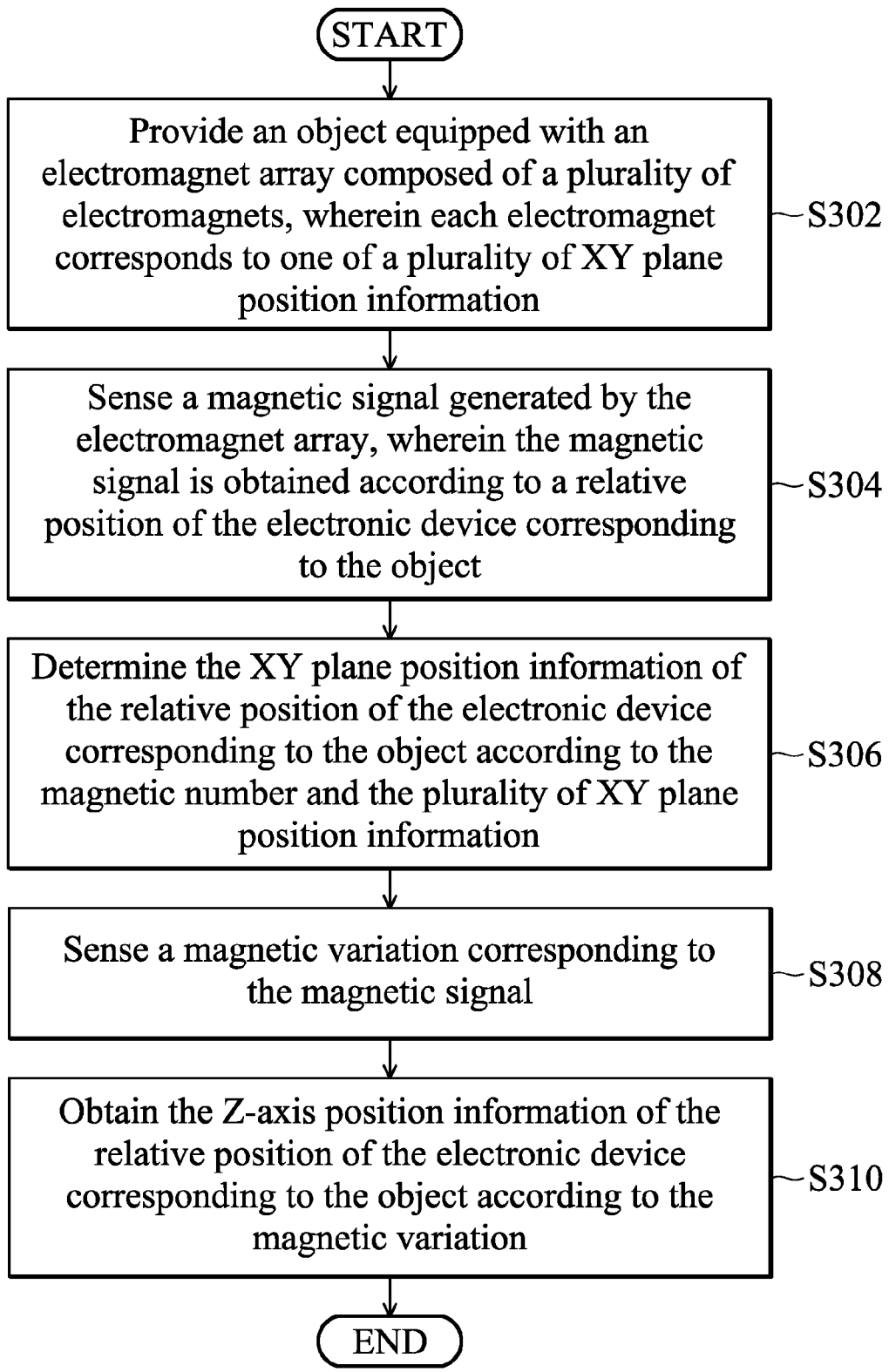
FIG. 3 is a flow diagram illustrating the method for using electromagnet arrays to determine a 3D relative position of an electronic device corresponding to an object according to the first embodiment of the present invention.

FIG. 3 is a flow diagram 300 illustrating the method for using electromagnet arrays to determine a 3D relative position of an electronic device corresponding to an object according to the first embodiment of the present invention with reference to FIG. 1. First, in step S302, an object equipped with an electromagnet array composed of a plurality of electromagnets is provided, wherein each electromagnet corresponds to one of a plurality of XY plane position information. In step S304, the magnetic sensor of an electronic device senses a magnetic signal generated by the electromagnet array, wherein the magnetic signal is obtained according to a relative position of the electronic device corresponding to the object. In step S306, the processing unit of the electronic device determines the XY plane position information of the relative position of the electronic device corresponding to the object according to the magnetic number and the plurality of XY plane position information. In step S308, the magnetic sensor senses a magnetic variation corresponding to the magnetic signal. Finally, in step S310, the processing unit obtains the Z-axis position information of the relative position of the electronic device corresponding to the object according to the magnetic variation.

Therefore, by using the method and the system for using electromagnet arrays to determine the 3D relative position of an electronic device corresponding to an object, the 3D relative position information of the electronic device corresponding to the object can be obtained according to the magnetic number generated from the electromagnet arrays. The user can interact with the object by using the electronic device to obtain the corresponding information and services.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for using electromagnet arrays to determine a 3D relative position of an electronic device corresponding to an object, comprising the steps of:
   providing an object equipped with an electromagnet array composed of a plurality of electromagnets, wherein each electromagnet corresponds to one of a plurality of XY plane position information;
   sensing, by a magnetic sensor of an electronic device, a magnetic signal generated by the electromagnet array, wherein the magnetic signal is obtained according to a relative position of the electronic device corresponding to the object;
   determining, by a processing unit of the electronic device, the XY plane position information of the relative position of the electronic device corresponding to the object according to the magnetic signal and the plurality of XY plane position information;
   sensing, by the magnetic sensor, a magnetic variation corresponding to the magnetic signal; and
   obtaining, by the processing unit, a Z-axis position information of the relative position of the electronic device corresponding to the object according to the magnetic variation.

2. The method for using electromagnet arrays to determine a 3D relative position of an electronic device corresponding to an object as claimed in claim 1, wherein the step of determining the Z-axis position information further comprises:
   dividing, by the processing unit, a range of the magnetic variation into a plurality of sections, wherein each section corresponds to one of a plurality of Z-axis position information;
   determining, by the processing unit, one of the plurality of sections as a corresponding section according to the magnetic variation; and
   determining the Z-axis position information of the relative position of the electronic device corresponding to the object according to the plurality of Z-axis position information.

3. The method for using electromagnet arrays to determine a 3D relative position of an electronic device corresponding to an object as claimed in claim 1, further comprising the steps of:
   receiving, by a computer, the XY plane position information and the Z-axis position information transmitted by the processing unit, and transmitting corresponding information to the processing unit according to the XY plane position information and the Z-axis position information.

4. The method for using electromagnet arrays to determine a 3D relative position of an electronic device corresponding to an object as claimed in claim 1, wherein each electromagnet corresponds to one of a plurality of magnet numbers, and the magnetic signal is the magnet number of the electromagnet which is closest to the electronic device among the plurality of electromagnets, the method further comprising the steps of:
   storing, by a storage unit of the electronic device, the XY plane position information corresponding to each magnet number; and
   obtaining, by the processing unit, the magnet number according to the magnetic signal, and obtaining the XY plane position information of the electronic device corresponding to the object from the storage unit according to the XY plane position information corresponding to each magnet number and the magnet number stored in the storage unit.

5. The method for using electromagnet arrays to determine a 3D relative position of an electronic device corresponding to an object as claimed in claim 1, wherein each electromagnet corresponds to one of a plurality of magnet numbers, and the magnetic signal is the magnet number of the electromagnet which is closest to the electronic device among the plurality of electromagnets, the method further comprises the steps of:
   executing, by the processing unit, an application with display information, wherein each magnet number corresponds to one of the display information; and
   executing, by the processing unit, the application to obtain the display information corresponding to the magnet number according to the magnet number, and to display the display information corresponding to the magnet number.

6. The method for using electromagnet arrays to determine a 3D relative position of an electronic device corresponding to an object as claimed in claim 1, wherein each electromagnet corresponds to one of a plurality of magnet numbers, and the magnetic signal is the magnet numbers of the plurality of electromagnets which are close to the electronic device within a specific range, the method further comprises the steps of:
   storing, by a storage unit of the electronic device, the XY plane position information corresponding to each magnet number; and
   obtaining, by the processing unit, a plurality of XY plane position information corresponding to the magnet numbers of the plurality of electromagnets which are close to the electronic device, and calculating a center of the plurality of XY plane position information; and obtaining, by the processing unit, the XY plane position information of the electronic device corresponding to the object from the storage unit.

7. The method for using electromagnet arrays to determine a 3D relative position of an electronic device corresponding to an object as claimed in claim 1, further comprising the steps of:

providing a plurality of objects, wherein each object corresponds to an object number and is equipped with an electromagnet array composed of a plurality of electromagnets, each electromagnet corresponds to one of a plurality magnet numbers, and the magnetic signal is the object number of the object which is the closest to the electronic device among the plurality of objects and the magnet number of the electromagnet which is the closest to the electronic device among the plurality of electromagnets;

executing, by the processing unit, an application with display information, wherein each magnet number of each object number corresponds to one of the display information in advance; and executing, by the processing unit, the application and to obtain the display information corresponding to the magnet signal according to the object number, the magnet number, and the display information corresponding to each magnet number of each object number, and to display the display information corresponding to the magnet signal via the application.

8. The method for using electromagnet arrays to determine a 3D relative position of an electronic device corresponding to an object as claimed in claim 1, further comprising the steps of:

receiving, by a satellite positioning unit of the electronic device, a satellite positioning information;

providing a plurality of objects, wherein each object corresponds to an object number, and is equipped with an electromagnet array composed of a plurality of electromagnets, each electromagnet corresponds to one of a plurality of magnet numbers, and the magnetic signal is the magnet number of the electromagnet which is the closest to the electronic device among the plurality of electromagnets;

executing, by the processing unit, an application with object geographic location information and display information, wherein each object number corresponds to one of the object geographic location information and one of the display information in advance; and executing, by the processing unit, the application to determine the object number of the object which is closest to the electronic device according to the satellite positioning information and the object geographic location information corresponding to the object number, and to obtain the display information corresponding to the magnet signal according to the object number, the magnet number, and the display information corresponding to the magnet number of the object number, and displaying the display information corresponding to the magnet signal via the application.

9. A system for using electromagnet arrays to determine a 3D relative position of an electronic device corresponding to an object, comprising:

an object, configured to be equipped with an electromagnet array composed of a plurality of electromagnets, wherein each electromagnet corresponds to one of a plurality of XY plane position information; and an electronic device, which comprises:

a magnetic sensor, configured to sense a magnetic signal generated by the electromagnet array, wherein the magnetic signal is obtained according to a relative position of the electronic device corresponding to the object; and a processing unit, coupled to the magnetic sensor and configured to determine the XY plane position information of the relative position of the electronic device corresponding to the object according to the magnetic signal and the plurality of XY plane position information, and obtain a Z-axis position information of the relative position of the electronic device corresponding to the object according to a magnetic variation corresponding to the magnetic signal sensed by the magnetic sensor.

10. The system for using electromagnet arrays to determine a 3D relative position of an electronic device corresponding to an object as claimed in claim 9, wherein the processing unit divides a range of the magnetic variation into a plurality of sections, wherein each section corresponds to one of a plurality of Z-axis position information, determines one of the plurality of sections as a corresponding section according to the magnetic variation, and determines the Z-axis position information of the relative position of the electronic device corresponding to the object according to the plurality of Z-axis position information.

11. The system for using electromagnet arrays to determine a 3D relative position of an electronic device corresponding to an object as claimed in claim 9, further comprising a computer, coupled to the object and the electronic device and configured to receive the XY plane position information and the Z-axis position information transmitted by the processing unit, and transmitting corresponding information to the processing unit according to the XY plane position information and the Z-axis position information.

12. The system for using electromagnet arrays to determine a 3D relative position of an electronic device corresponding to an object as claimed in claim 9, wherein each electromagnet corresponds to one of a plurality of magnet numbers, and the magnetic signal is the magnet number of the electromagnet which is closest to the electronic device among the plurality of electromagnets, the electronic device further comprises:

a storage unit, configured to store the XY plane position information corresponding to each magnet number, wherein the processing unit obtains the magnet number according to the magnetic signal, and obtaining the XY plane position information of the electronic device corresponding to the object from the storage unit according to the XY plane position information corresponding to each magnet number and the magnet number stored in the storage unit.

13. The system for using electromagnet arrays to determine a 3D relative position of an electronic device corresponding to an object as claimed in claim 9, wherein each electromagnet corresponds to one of a plurality of magnet numbers, and the magnetic signal is the magnet number of the electromagnet which is the closest to the electronic device among the plurality of electromagnets, and the processing unit further executes an application with display information;

wherein each magnet number corresponds to one of the display information in advance, and obtains the display information corresponding to the magnet number according to the magnet number, and display the display information corresponding to the magnet number via the application.

14. The system for using electromagnet arrays to determine a 3D relative position of an electronic device corresponding to an object as claimed in claim 9, wherein each electromagnet corresponds to one of a plurality of magnet numbers, and the magnetic signal is the magnet numbers of the plurality of electromagnets which are close to the electronic device within a specific range, the electronic device further comprising:

a storage unit, configured to store the XY plane position information corresponding to each magnet number,
   wherein the processing unit obtains a plurality of XY plane position information corresponding to the magnet numbers of the plurality of electromagnets which are close to the electronic device, calculates a center of the plurality of XY plane position information, and obtains the XY plane position information of the electronic device corresponding to the object from the storage unit.

15. The system for using electromagnet arrays to determine a 3D relative position of an electronic device corresponding to an object as claimed in claim 9, further comprising:

a plurality of objects, wherein each object corresponds to an object number respectively, and is equipped with a electromagnet array composed of a plurality of electromagnets respectively, each electromagnet corresponds to one of a plurality of magnet numbers, and the magnetic signal is the object number of the object which is closest to the electronic device among the plurality of objects and the magnet number of the electromagnet which is closest to the electronic device among the plurality of electromagnets,
   wherein the processing unit executes an application with display information and each magnet number corresponds to one of the display information in advance; and
   the processing unit obtains the display information corresponding to the magnet signal according to the object number, the magnet number and the display information corresponding to each magnet number of each object number, and displays the display information corresponding to the magnet number via the application.

16. The system for using electromagnet arrays to determine a 3D relative position of an electronic device corresponding to an object as claimed in claim 9, wherein the electronic device further comprises:

a satellite positioning unit, coupled to the processing unit and configured to receive a satellite positioning information;
   wherein the system further comprises a plurality of objects and each object corresponds to an object number, and is equipped with a electromagnet array composed of a plurality of electromagnets, each electromagnet corresponds to one of a plurality of magnet numbers, and the magnetic signal is the magnet number of the electromagnet which is closest to the electronic device among the plurality of electromagnets;
   wherein the processing unit executes an application with object geographic location information and display information, wherein each object number corresponds to one of the object geographic location information and one of the display information in advance; and
   wherein the processing unit determines the object number of the object which is closest to the electronic device according to the satellite positioning information and the object geographic location information corresponding to the object number, and obtains the display information corresponding to the magnet signal according to the object number, the magnet number, and the display information corresponding to the magnet number of the object number, and displays the display information corresponding to the magnet number via the application.

\* \* \* \* \*